c

(12) United States Patent
Mallon et al.

(10) Patent No.: US 8,713,493 B2
(45) Date of Patent: Apr. 29, 2014

(54) SYSTEM AND METHOD FOR SOLVING CONNECTION VIOLATIONS

(75) Inventors: David Mallon, Edinburgh (GB); Kenny Mackie, Edinburgh (GB)

(73) Assignee: Cadence Design Systems, Inc., San Jose, CA (US)

( * ) Notice: Subject to any disclaimer, the term of this patent is extended or adjusted under 35 U.S.C. 154(b) by 586 days.

(21) Appl. No.: 12/819,077

(22) Filed: Jun. 18, 2010

(65) Prior Publication Data

US 2010/0257497 A1    Oct. 7, 2010

Related U.S. Application Data

(63) Continuation of application No. PCT/US2007/088718, filed on Dec. 21, 2007.

(51) Int. Cl.
*G06F 17/50* (2006.01)
(52) U.S. Cl.
USPC .......................... 716/103; 716/102
(58) Field of Classification Search
USPC ................................. 716/100–104
See application file for complete search history.

(56) References Cited

U.S. PATENT DOCUMENTS

| 4,928,160 | A | 5/1990 | Crafts |
|---|---|---|---|
| 6,637,011 | B1 * | 10/2003 | Zolotykh et al. ............... 716/103 |
| 6,671,866 | B2 | 12/2003 | Arsintescu |
| 7,089,511 | B2 * | 8/2006 | Allen et al. .................... 716/103 |
| 7,191,426 | B1 * | 3/2007 | Singh et al. .................... 716/104 |
| 7,240,314 | B1 | 7/2007 | Leung |
| 7,594,204 | B1 * | 9/2009 | Singh et al. .................... 716/132 |
| 2002/0042906 | A1 * | 4/2002 | Takayanagi et al. ............ 716/21 |
| 2003/0101430 | A1 * | 5/2003 | Liebmann et al. .............. 716/19 |
| 2004/0111686 | A1 * | 6/2004 | Chang et al. ...................... 716/6 |
| 2005/0034087 | A1 | 2/2005 | Hamlin et al. |

* cited by examiner

*Primary Examiner* — Binh Tat
(74) *Attorney, Agent, or Firm* — Kenyon & Kenyon LLP

(57) ABSTRACT

The present invention provides a method for resolving a circuit connection violation that comprises categorizing a circuit chain with the connection violation into a class, and performing one or more transformation algorithms on the circuit chain from the group consisting of a chain mirror, a cascade mirror, a cascade mirror permute, and a cut chain mirror algorithm based on the class of the circuit chain.

23 Claims, 11 Drawing Sheets

SYSTEM AND METHOD FOR SOLVING CONNECTION VIOLATIONS

CROSS-REFERENCE TO RELATED APPLICATIONS

This application is a continuation of and claims priority from Patent Cooperation Treaty application Serial Number PCT/US2007/88718 filed Dec. 21, 2007, which is hereby incorporated herein by reference in its respective entirety.

TECHNICAL FIELD

The present invention generally relates to a connection violation solver, and more particularly, some embodiments relate to methods for solving connection violations in a circuit chain.

DESCRIPTION OF THE RELATED ART

Connectivity violations occur when different net connections are present at the interface between devices. Connectivity violations may occur during the design stage of the circuit when a circuit designer edits the circuit layout or when a chaining algorithm attempts to abut devices together to construct chains. Abutting devices together allows chains of devices to be formed if the connections between the abutting devices share the same net connection. This results in a circuit network that uses less area than would be required if abutment is not performed.

Abutting the interfaces of two devices is often not possible if the net connection of the interfaces are not the same. This condition typically creates a connection violation for the two devices. It is possible to resolve simple connection violations and chain the devices together by transforming one of the devices. However, conventional transformation methods are insufficient to resolve various types of connection violations without further creating connection violations within the chain. This problem typically occurs where one or more devices are already part of a chain.

BRIEF SUMMARY OF EMBODIMENTS OF THE INVENTION

According to various embodiments of the invention, systems and methods for resolving connection violations between circuit chains are provided. In accordance with one embodiment of the invention, a method for resolving a circuit connection violation is provided. The method includes categorizing a circuit chain with the connection violation into a class; and performing one or more transformation algorithms on the circuit chain from the group consisting of a chain mirror, a cascade mirror, a cascade mirror permute, and a cut chain mirror algorithm based on the class of the circuit chain.

The method may further include categorizing the circuit chain into a plurality of classes categorized by symmetry, number of nets, chain type, static chain, and moving chain. In this way, the method may execute the transformational algorithm on the circuit chain based on the plurality of classes.

In an embodiment, the method invokes a first sequence of transformation algorithms for the circuit chain with moving chain classification until the connection violation of the circuit chain is resolved. The first sequence comprises: performing a chain mirror algorithm, performing a cascade mirror algorithm, performing a cascade mirror permute algorithm, and performing a cut chain mirror algorithm. After each algorithm, the connection violation in the circuit chain is checked to determine whether it has been solved.

In addition to the embodiment above, the method invokes a second sequence of transformation algorithms for the circuit chain with static chain classification. The second sequence comprises: performing a chain mirror, performing a cascade mirror, performing a cascade mirror permute, and performing a cut chain mirror. Again, after each algorithm, the connection violation in the circuit chain is checked to determine whether it has been solved. In one embodiment, the second sequence is invoked if the connection violation has not been solved after the first sequence is executed.

Further, the method invokes a third sequence of transformation algorithms for the circuit chain with a static and a moving chain. The third sequence comprises: a) performing a chain mirror on the moving chain portion of the circuit chain while performing a chain mirror on the static chain portion of the circuit chain; b) performing a chain mirror on the moving chain portion of the circuit chain while performing a cascade mirror permute on the static chain portion of the circuit chain; c) performing a cascade mirror or a cascade mirror permute on the moving chain portion of the circuit chain while performing a chain mirror on the static chain portion of the circuit chain; and d) performing a cascade mirror or a cascade mirror permute on the moving and static chain portions. In one embodiment, the third sequence is invoked if the connection violation has not been solved after the second sequence is executed.

In a further embodiment, the third sequence further comprises: e) performing a chain mirror on the moving chain portion of the circuit chain while performing a cut chain mirror on the static chain portion of the circuit chain; f) performing a cut chain mirror on the moving chain portion of the circuit chain while performing a chain mirror on the static chain portion of the circuit chain; g) performing a cascade mirror permute on the moving chain portion of the circuit chain while performing a cut chain mirror on the static chain portion of the circuit chain; h) performing a cut chain mirror on the moving chain portion of the circuit chain while performing a cascade mirror permute on the static chain portion of the circuit chain; i) performing a cut chain mirror on the moving chain portion of the circuit chain while performing a cut chain mirror on the static chain portion of the circuit chain.

In an embodiment, the method further includes performing the chain mirror algorithm on the circuit chain if it is asymmetric. The chain mirror algorithm comprises mirroring an asymmetric circuit chain about an axis parallel to an abutment interface.

In yet another embodiment, the method further comprises performing the cascade mirror algorithm on the circuit chain if it contains only simple device types and has two connecting nets. The cascade mirror algorithm comprises mirroring each device in the chain in turn about an axis parallel to an abutment interface and subsequently re-abutting the abutment interface with a neighboring abutment interface.

In a further embodiment, the method only performs cascade mirror permute algorithm on the circuit chain if the circuit chain is of complex type and has two connecting nets. The cascade mirror permute algorithm comprises: permuting each even-fingered device in the chain in turn, mirroring each simple device about an axis parallel to an abutment interface; and re-abutting the abutment interface with a neighboring abutment interface.

In a further embodiment, the method performs a cut chain mirror algorithm on the circuit chain if it is symmetric. The cut chain mirror algorithm comprises: cutting a symmetric circuit chain into two asymmetric chains; mirroring each asymmetric circuit chain about an axis parallel to an abutment interface; and re-abutting the two asymmetric chains.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

1. Overview

Before describing the invention in detail, it is useful to describe an example environment in which the invention may be implemented. After reading this description, it will become apparent to one of ordinary skill in the art how the invention can be implemented in different and alternative environments. In one embodiment, the invention can be implemented using a software application such as a design tool running on a computer or computing system. The computer or computing system might be a personal computer, workstation, minicomputer, mainframe, etc. The computer might include various input devices, such as a keyboard, mouse, trackball, etc.; various output devices, such as a monitor, printer, etc.; various communication ports such as network connections, USB ports, serial and parallel I/O ports, etc.; and various storage devices, such as ROM, RAM, disk drives, magnetic disks, magnetic tape drives, etc.

Monitors and printing devices can be used to provide a visual display of the design as well as other ancillary information to aid the developer in the design process, including various GUIs, graphical representations and other information. Storage devices, whether networked or local, can be used to store data and other information including design tools, design kit information, libraries and so on.

Figure 1:
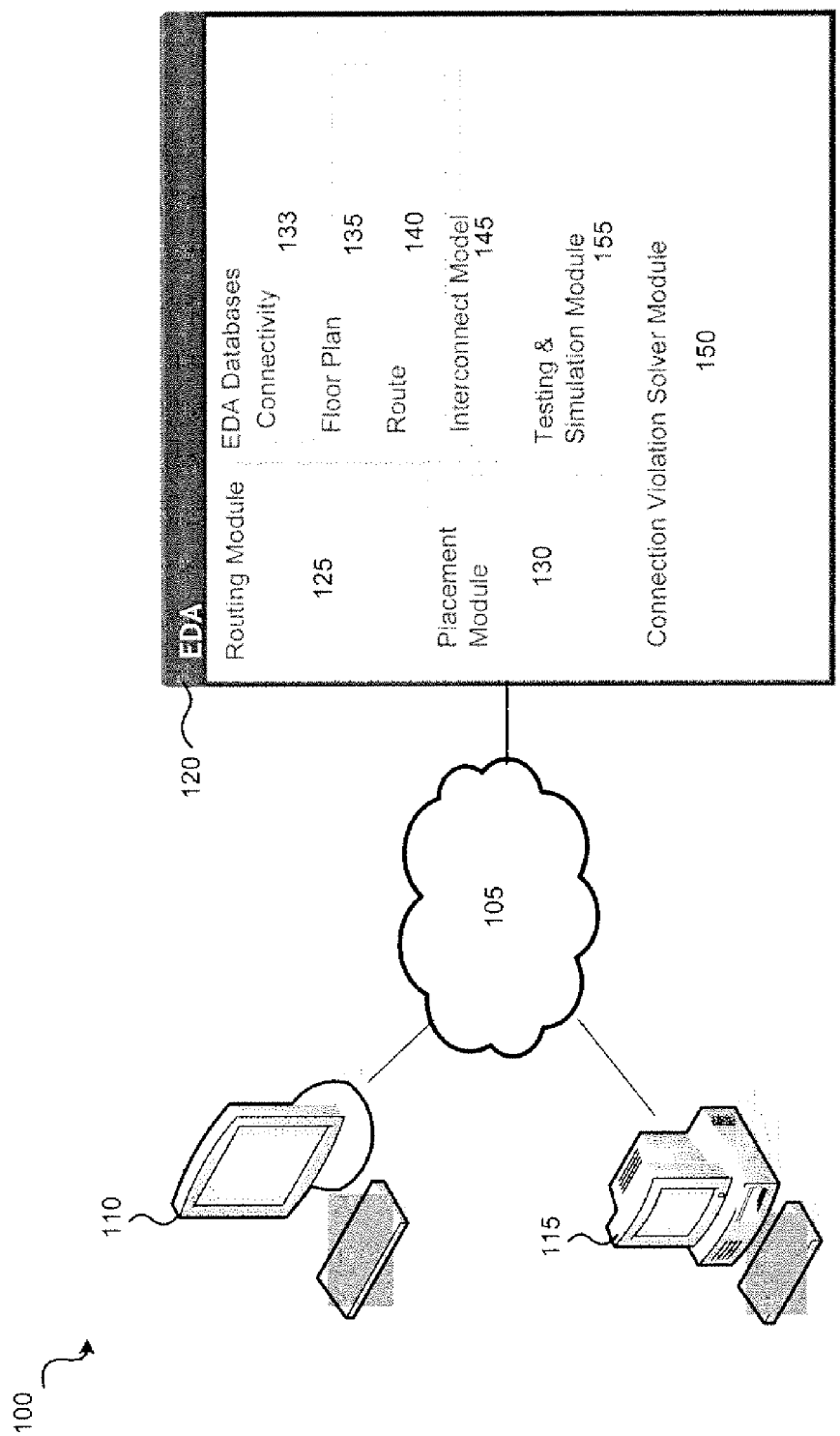
FIG. 1 illustrates an example environment in which the violation solver is implemented according to an embodiment of the present invention.

FIG. 1 illustrates an example environment 100 in which the design tool software may be implemented. Environment 100 includes a network 105, a workstation 110, a computer 115, and a design tool module 120. Network 105 can be the internet, a local area network (LAN), a wide area network (WAN), the plain old telephone system (POTS), or any other suitable network. As shown in FIG. 1, design tool module 120 is coupled to network 105. This enables design tool module 120 to communicate with workstation 110 and computer 115. It should be noted that design tool module 120, workstation 110 and computer 115 may connect to network 105 using various means such as, for example, via a wireless or wired interface. Design tool 120 may reside on a server that is connected to network 105.

In general, the circuit designing process is a top-down process. Circuit designers typically start the circuit designing process by defining and designing functional blocks or cells. A circuit cell typically comprises a plurality of basic circuit elements such as resistors, capacitors, inductors, and transistors for example. A circuit cell may also comprise a single circuit element. Once the functional blocks or cells of a circuit are designed and laid out, I/O pins for each cell are defined. A cell may have one or more I/O pins, each of which may be connected to other I/O pins of another cell. A pair of cells connected via their I/O pins forms a net.

As mentioned, a cell may comprise a plurality of transistors. In the situation where a cell comprises several metal oxide semiconductor field effect transistors (MOSFETs), a transistor chain is often formed. In a complex circuit, there may be hundreds of cells with transistor chains that may need to be connected together. In this case, it is extremely difficult to visualize the net connections without the aid of a design software tool such as design tool 120.

It is also impractical to optimize the connection of hundreds or thousands of net interfaces manually. Further, connection violations often occur during the abutment process at interfaces of two nets. Manually solving each connection violation is too time consuming, thus it is not a favored option. In one embodiment, design tool 120 includes an automatic connection violation solver to help circuit designers with this task.

As shown in the example illustrated in FIG. 1, design tool 120 includes a routing module 125, a placement module 130, a connectivity database 133, a floor plan database 135, a routing database 140, an interconnect model database 145, a testing & simulation module 155, and a connection violation solver module 150. Each component of design tool 120 can play a role in the design process of a circuit. For example, in one embodiment, databases 130-145 provide information used to fully route and place a circuit design. In one embodiment, this can be performed by routing module 125 and placement module 130. Modules 125 and 130 may include abutting algorithms to connect the interfaces of transistor chains.

Connection violations could occur during the process of abutting transistors and transistor chains. Connection violations can be detected during the connectivity extraction process. In one embodiment, this is done with a connection extractor module. In any case, once connection violations are identified, violation solver module 150 resolves the violation by applying a heuristic approach, which will be discussed in detail below. In one embodiment, violation solver module 150 is a standalone application and independent of design tool 120. Various embodiments of violation solver module 150 will now be discussed.

2. Connection Violation Solver Module

In one embodiment, violation solver module 150 starts the connection violation solving process by categorizing chains into various categories. A chain may belong to one or more categories. In one embodiment, violation solver module 150 categorizes a chain by its symmetry. A chain can be asymmetric or symmetric. A symmetrical chain has the same interface at each end of the chain. In contrast, an asymmetrical chain has different interfaces at each end of the chain. Violation solver module 150 can also be configured to categorize a chain by the number of connecting nets it has. A chain may have one or more nets. Generally, a chain has two or more connecting nets. In addition, a chain is also categorized by the device types in the chain. The chain type may be simple or it may be complex.

In one embodiment, a simple chain contains only simple devices. Simple devices are those devices that can be effectively mirrored as the nets connected to the source and drain connections are different. Simple devices have an odd number of fingers making up the gate. In contrast, a device with an even number of fingers cannot be effectively mirrored. In a complex chain, one or more devices in the chain fall into this category and cannot be effectively mirrored. Although a particular order is described above with respect to the categorizing a chain by violation solver module 150, a different order may be used.

In one embodiment, violation solver module 150 further categorizes a device into two additional types: even multi-fingered device and odd multi-fingered device. The former is a single device with an even number of fingers that make up the gate. The latter is a single device with an odd number of fingers. Multi-fingered devices are also referred to as folded devices.

In one embodiment, violation solver module 150 categorizes a chain by chain-type such as two-net chain and multi-net chain. A two-net chain is a chain with only two nets connected to the sources and drains in a chain of devices. The two-net chain may have any number of gate nets. A multi-net chain is similar to the two-net chain, but has more than two source and drain nets.

In one embodiment, using the classification of chain type, number of connecting nets, and symmetry described above, violation solver module 150 executes one or more transformation algorithms on the pair of chains with the connection violation. Transformation algorithms can be configured to alter one or more interfaces of the chain pair without destroying the integrity of the devices within the chain. Once the interface or interfaces of the chain pair are altered, violation solver module 150 re-abuts the interfaces of the chain pair to see if the violation has been solved.

In one embodiment, violation solver module 150 executes one transformation algorithm at a time on the chain with the connection error. Once this is accomplished, violation solver module 150 checks to see if the executed algorithm solves the connection violation. If the connection violation still exists, violation solver module 150 executes another transformation algorithm. The type of transformation algorithm executed at each stage might depend on a heuristic rule according to an embodiment of the present invention, which will be discussed in detail below. In a situation where the connection violation persists, violation solver module 150 may execute one or more different transformation schemes to solve the connection violation. In an embodiment, violation solver module 150 uses 17 different schemes comprising five different transformation algorithms. Each of these algorithms will now be discussed.

As mentioned, in one embodiment, there are five basic transformation algorithms used by violation solver module 150. The five transformation algorithms are: chain mirror, cascade mirror, cascade mirror permute, cut chain mirror, and double mirror.

A chain mirror algorithm performs a mirroring function on an asymmetric chain. In the chain mirror algorithm, a chain is mirrored about an axis parallel to the abutment interface. The abutment interface is the interface where the violation exists with another interface of another net or chain. A chain mirror algorithm causes the end net to become the interface net.

In one embodiment, violation solver module 150 typically performs a chain mirror algorithm on an asymmetric chain. In the chain mirror algorithm, the chain is mirrored about an axis parallel to the abutment interface and re-abutted to its neighboring interface.

The second algorithm is a cascade mirror algorithm. In one embodiment, violation solver module 150 typically only performs this algorithm on a simple chain. Additionally, violation solver module 150 usually performs the cascade mirror and the cascade mirror permute in tandem. For a simple chain, cascade mirror is performed if each device in the chain is a simple device. Alternatively, cascade mirror permute is performed if a device in the chain cannot be mirrored. Permuting is a process where the source-drain connections are swapped or permuted in a device. In an embodiment, violation solver module 150 favors the cascade mirror algorithm over the cascade mirror permute algorithm. This means the former can be performed first. If the connection violation still persists, the latter will be performed on the chain. In an example where a chain is a single device, the transformation algorithm selected can be a single mirror or permute.

Even-fingered devices fall into the category of devices that typically cannot be effectively mirrored. There are several categories of device types: even multi-fingered device and odd multi-fingered device. The former is a single device with an even number of fingers that make up the gate. The latter is a single device with an odd number of fingers.

The fourth algorithm is a cut chain mirror algorithm. In one embodiment, violation solver module 150 only performs the cut chain mirror algorithm on a symmetric chain. In this algorithm, violation solver module 150 cuts a symmetric chain to create two asymmetric chains. Violation solver module 150 then executes chain mirror on each of the new asymmetric chains thus abutting the former interface and end nets. In an alternative embodiment, the two asymmetric chains can be shifted such that the original interface and end net overlap.

The fifth transformation algorithm used by violation solver module 150 is a double mirror algorithm. In the double mirror algorithm, both chains are transformed by applying a single chain transformation to each chain. Alternatively, different transformations can be applied to each chain.

In one embodiment, violation solver module 150 selects which transformation algorithms to perform on the chain by following a systematic rule. The rule might be implemented, for example, to select the algorithm or algorithms to perform based on the categories membership of the chain. The four basic memberships can be classified by symmetric or asymmetric, two-net or multi-net, and simple or complex. The first membership group comprises a circuit chain that has the following properties: asymmetric, any number of nets, and any device types (e.g., simple or complex/even-fingered). The second membership group comprises a circuit chain that has the following properties: any symmetry (e.g., asymmetric or symmetric), two nets, and comprising simple devices. The third membership group can have the following properties: any symmetry, two nets, and any device type (simple or complex) in the chain. The fourth membership group can have the following properties: symmetric, any number of nets, and any device type. The above set of memberships is illustrated in Table 1 below.

TABLE 1

| Chain Type | Transformation | | |
|---|---|---|---|
| | Symmetry (Symmetric/ Asymmetric) | Number Of Nets | Device Types (Simple/ Complex) |
| Chain Mirror | Asymmetric | Any | Any |
| Cascade Mirror | Any | 2 | Simple |
| Cascade Mirror Permute | Any | 2 | Any |
| Cut Chain Mirror | Symmetric | Any | Any |

Table 1 also further illustrates the types of transformation algorithms that violation solver module 150 may perform on the membership group according to one embodiment. For group 1, violation solver module 150 uses a chain mirror transformation algorithm. For group 2, violation solver module 150 uses a cascade mirror transformation algorithm. For group 3, violation solver module 150 uses a cascade mirror permute transformation algorithm. For group 4, violation solver module 150 uses a cut chain mirror transformation algorithm.

Any chain that falls outside the classification of a particular group would not benefit from the transformation algorithm assigned to that group. It may also be unfeasible to perform a transformation to circuit chains that do not belong to the same group assigned to the algorithm. For example, performing a chain mirror on a symmetric circuit chain is fruitless because the transformation would yield the exact same circuit chain. This, of course, would not help eliminate the connection violation. Additionally, performing a cascade mirror on a multi-net chain is invalid as it breaks the chain when the mirror ripples along the chain and encounters the third unique net attached to the source or drain. Further, cascade transformations are effective on chains that have two nets that are alternately connected to the sources and drains of devices in the chain.

2.1 Transformation Algorithms, a Heuristic Approach

In solving the connection violation, violation solver module 150 may execute, where appropriate, one or more of the five transformation algorithms on the circuit chain or chains. In one embodiment, the algorithms executed depend on the membership group of the chain and the complexity of the connection violation. Certain connection violations are simple and might be solved after a single transformation algorithm. However, other connection violations are more complex because they may involve multiple chains of different types with different number of nets, etc. In this case, the solving process may take a few iterations, meaning multiple transformation algorithms can be performed on the circuit chain before the connection violation is resolved.

In one embodiment, violation solver module 150 starts the connection violation solving process by performing a series of transformation algorithms on the circuit chain in a predefined order while still observing the rules in Table 1. It should be noted that the rules in Table 1 ultimately control which algorithm or algorithms to perform on a chain.

Table 2 illustrates a sequence of algorithms implemented by violation solver module 150 to solve connection violations according to one embodiment. Table 2 shows the sequence of algorithms to be performed on two types of chains: moving and static chains. Generally, a moving chain is a chain that is not affixed to a net, thus it is more flexible than a static chain. Accordingly, in one embodiment, violation solver module 150 performs a transformation algorithm on the moving chain first in attempting to solve the connection violation. If the connection violation persists, violation solver module 150 performs the same series of algorithm to the static chain.

TABLE 2

| Sequence | Moving Chain | Static Chain |
|---|---|---|
| 1 | Chain Mirror | — |
| 2 | Cascade Mirror | — |
| 3 | Cascade Mirror Permute | — |
| 4 | Cut Chain Mirror | — |
| 5 | — | Chain Mirror |
| 6 | — | Cascade Mirror |
| 7 | — | Cascade Mirror Permute |
| 8 | — | Chain Mirror |

Table 2 illustrates a single chain transformation sequence implemented by violation solver module 150 according to one embodiment of the present invention. In the single chain transformation sequence, violation solver module 150 executes the following series of algorithms in order: chain mirror, cascade mirror, cascade mirror permute, and cut chain mirror. As mentioned, one or more of the algorithms in the sequence may not be executed due to the rules shown in Table 1. For example, if the chain is a symmetric, then the chain mirror algorithm will be skipped. In this case, violation solver module proceeds directly to the cascade mirror algorithm as long as the chain does not violate any Table 1 rules.

After a transformation algorithm is performed on the chain, violation solver module 150 checks the chain to see if the violation connection has been resolved. If the connection violation is resolved, violation solver module 150 searches for another connection violation and begins solving that connection violation starting from the beginning. If the connection violation persists, violation solver module 150 proceeds to the next transformation algorithm in the sequence. As shown in Table 2, the last test for a moving chain in a single transformation sequence is the cut chain mirror algorithm.

If the connection violation is still present after the cut chain mirror algorithm is performed on the moving chain, violation solver module 150 performs the same sequence of algorithms on the static chain in accordance with one embodiment. The sequence of test is again as follows: chain mirror, cascade mirror, cascade mirror permute, and cut chain mirror. The rules of Table 1 are still applicable.

Further, if the single chain transformations above are not able to resolve the connection violation, violation solver module 150 then performs a double chain transformation sequence. The double chain transformation sequence can be configured as a series of transformation algorithms performed on both the moving and static chain in a certain order. For example, in the first series of the double chain transformation sequence, a chain mirror algorithm is performed on both the moving chain and the static chain. This contrasts the single chain transformation order in Table 2 in that violation solver module 150 now executes two algorithms in each series or sequence instead of one.

TABLE 3

| Sequence | Moving Chain | Static Chain |
|---|---|---|
| 9 | Chain Mirror | Chain Mirror |
| 10 | Chain Mirror | Cascade Mirror/Permute |
| 11 | Cascade Mirror/Permute | Chain Mirror |

TABLE 3-continued

| Sequence | Moving Chain | Static Chain |
| --- | --- | --- |
| 12 | Cascade Mirror/Permute | Cascade Mirror/Permute |
| 13 | Chain Mirror | Cut Chain Mirror |
| 14 | Cut Chain Mirror | Chain Mirror |
| 15 | Cascade Mirror/Permute | Cut Chain Mirror |
| 16 | Cut Chain Mirror | Cascade Mirror/Permute |
| 17 | Cut Chain Mirror | Cut Chain Mirror |

The double chain transformation sequence may also observe the rules shown in Table 1. Additionally, after each sequence is performed or executed, violation solver module 150 checks to see if the connection violation has been resolved. If not, violation solver module 150 proceeds to the next sequence listed in Table 3. One or more of the sequences shown in Table 3 may not be executed due to conflicts with the rules of Table 1. If there are conflicts, violation solver module 150 simply moves to the next sequence listed on Table 3.

Referring to Table 3, when "Cascade Mirror/Permute" is called for in a sequence, violation solver module 150 performs cascade mirror permute algorithm whenever a complex chain is involved or whenever a regular cascade mirror would not be effective, otherwise a cascade mirror may be performed in all other situations.

Tables 2 and 3 include 17 different sequences of algorithms that violation solver module 150 may use to correct connection violation between two chains or within a chain. It should be noted that the sequence of algorithms in Tables 2 and 3 may be different. One skilled in the art would understand after reading this description that the sequence of algorithms may be manipulated to yield the same results. Such alternative sequences are within the scope of the present invention. FIGS. 2-9 illustrate examples of chains before and after transformation algorithms according to embodiments of the present invention.

Figure 2:
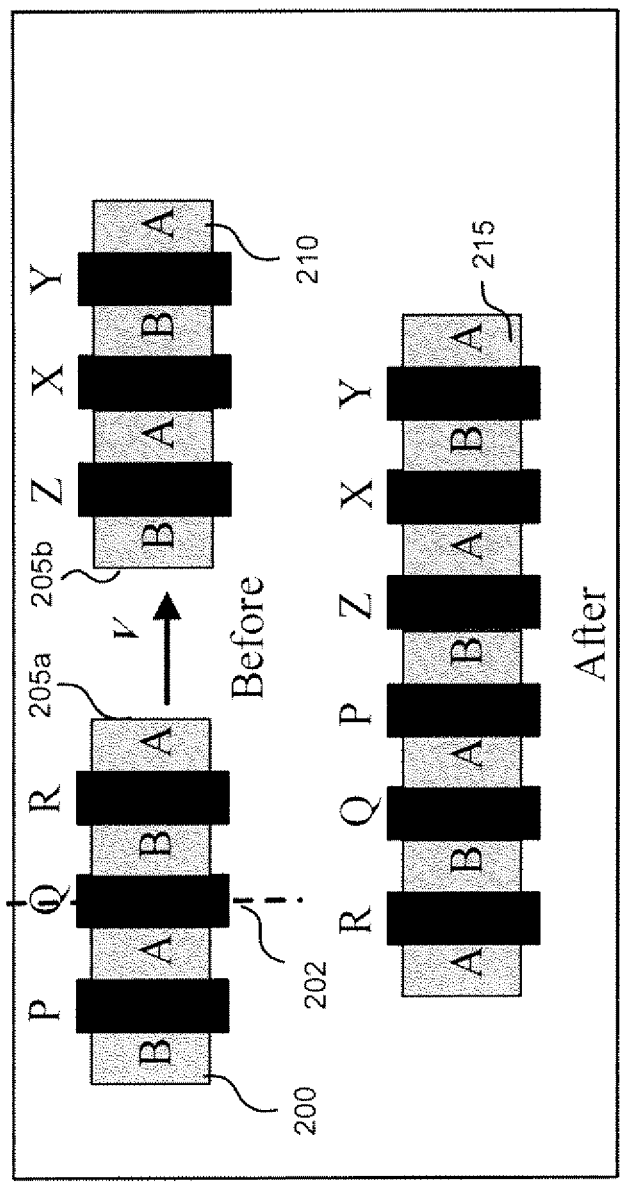
FIG. 2-9 illustrate before and after block diagrams of example circuit chains being transformed using the violation solver according to embodiments of the present invention.

FIG. 2 illustrates before and after examples of a chain on which a chain mirror transformation is performed according to one embodiment. Chain portion 200 is the moving portion. Chain portion 210 is considered to be the static portion. In this example, portion 200 is transformed by a chain mirror algorithm and combined with portion 210 to form chain 215. As shown, portion 200 is transformed about an axis 202, which is parallel to abutting interface 205a and 205b.

In the chain mirror algorithm, device R and P are swapped due to the mirroring effect about axis 202. This results in the abutting interface 205a being changed from A to B. A and B signify the source and the drain nets of a device, respectively, or vice versa.

Figure 3:
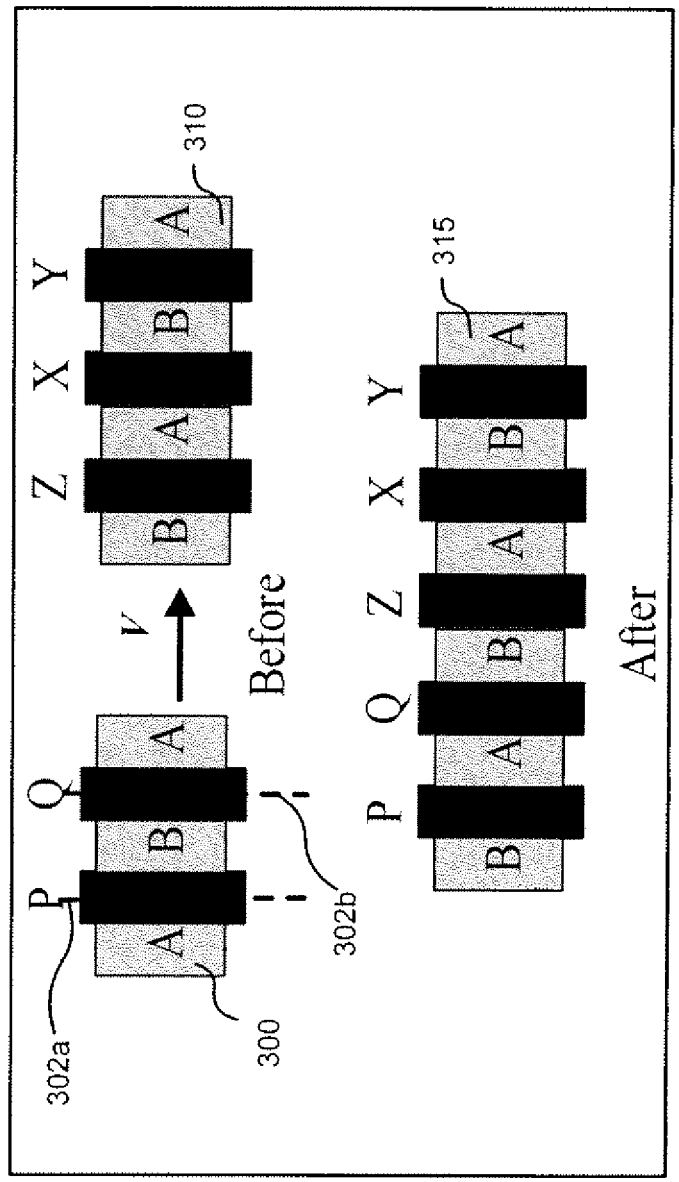

FIG. 3 illustrates, according to one embodiment, before and after examples of a chain in which a cascade mirror transformation is performed on a moving chain according to one embodiment. In the cascade mirror algorithm, each device is mirrored on its own axis, which is parallel to the abutting interface. As shown, device P of portion 300 is mirrored about an axis 302a, and device Q is mirrored about an axis 302b. Once this process is completed, portion 300 is abutted with static portion 310 to form chain 315.

Figure 4:
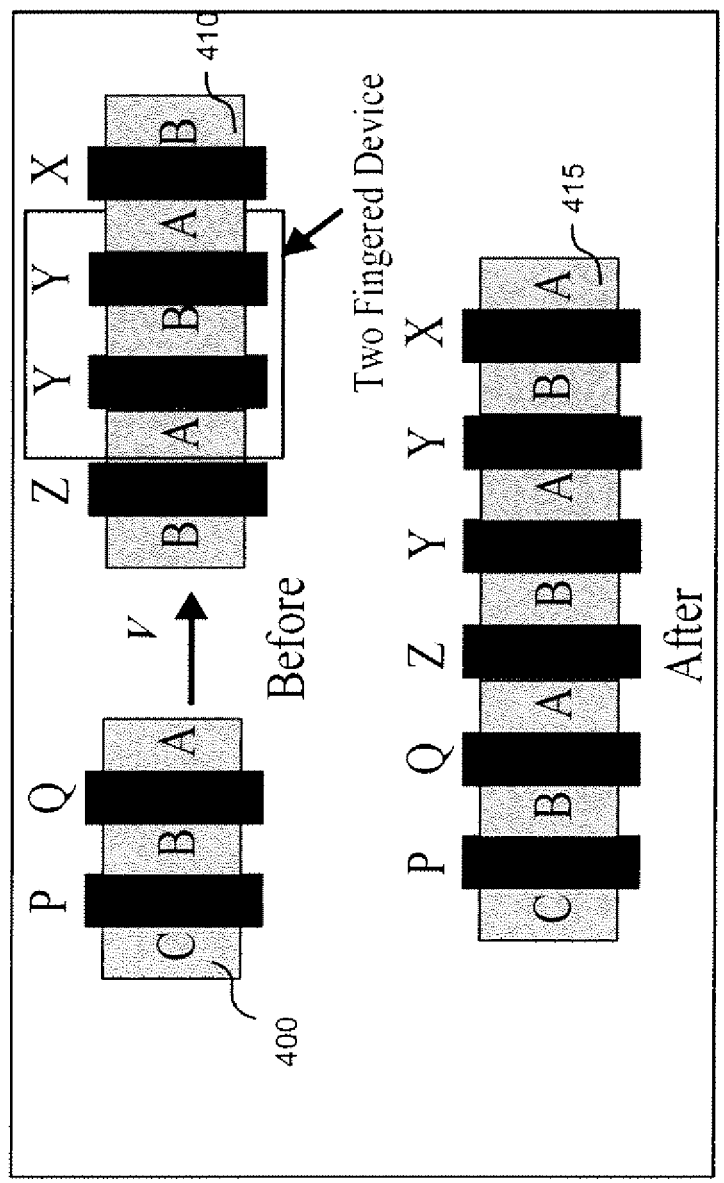

FIG. 4 illustrates before and after examples of a chain in which a cascade mirror permute transformation is performed on a static chain according to one embodiment. In FIG. 4, portion 400 is the moving chain and portion 410 is the static chain. Portion 410 contains a two-fingered device, which cannot be effectively mirrored. In the cascade mirror permute algorithm, each simple device is mirrored, and on each even-fingered device each source net is changed to a drain net and each drain net is changed to a source net; i.e. the connections are permuted Once this process is completed, portion 400 is abutted with static portion 410 to form chain 415.

Figure 5:
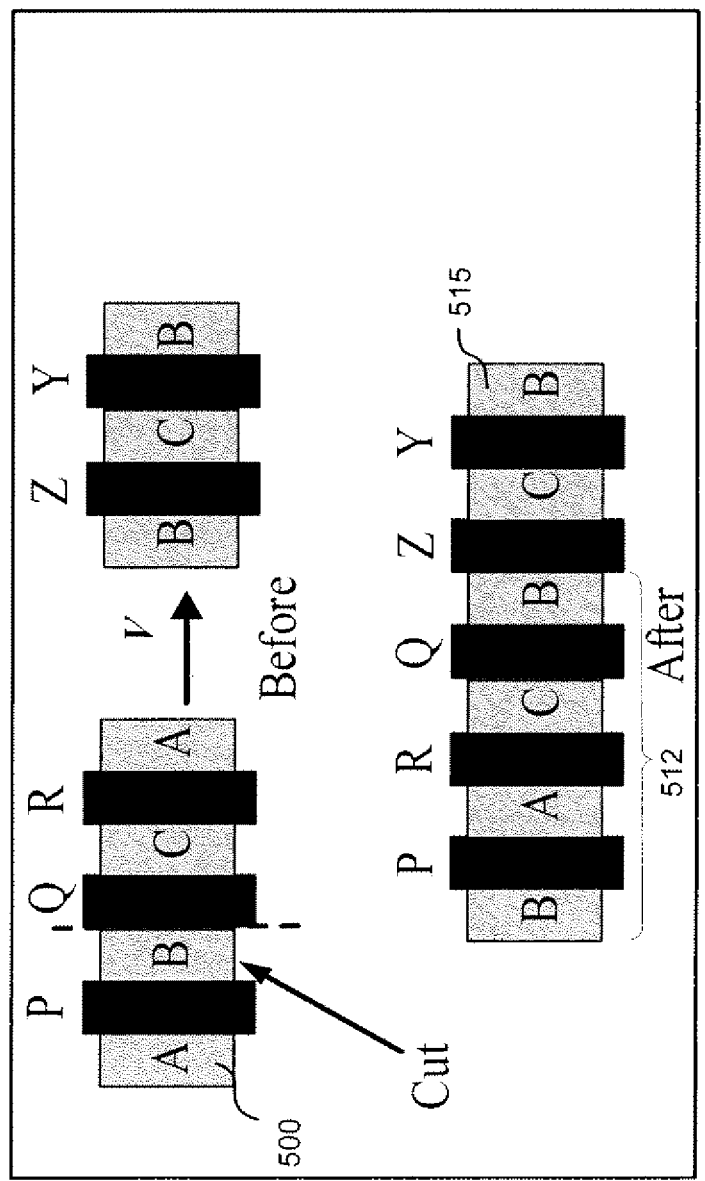

FIG. 5 illustrates before and after examples of a cut chain mirror transformation performed on a moving chain according to one embodiment. In this algorithm, portion 500 is cut into two asymmetric halves. Each of the halves is then mirrored and recombined to form portion 512 of chain 515.

Figure 6:
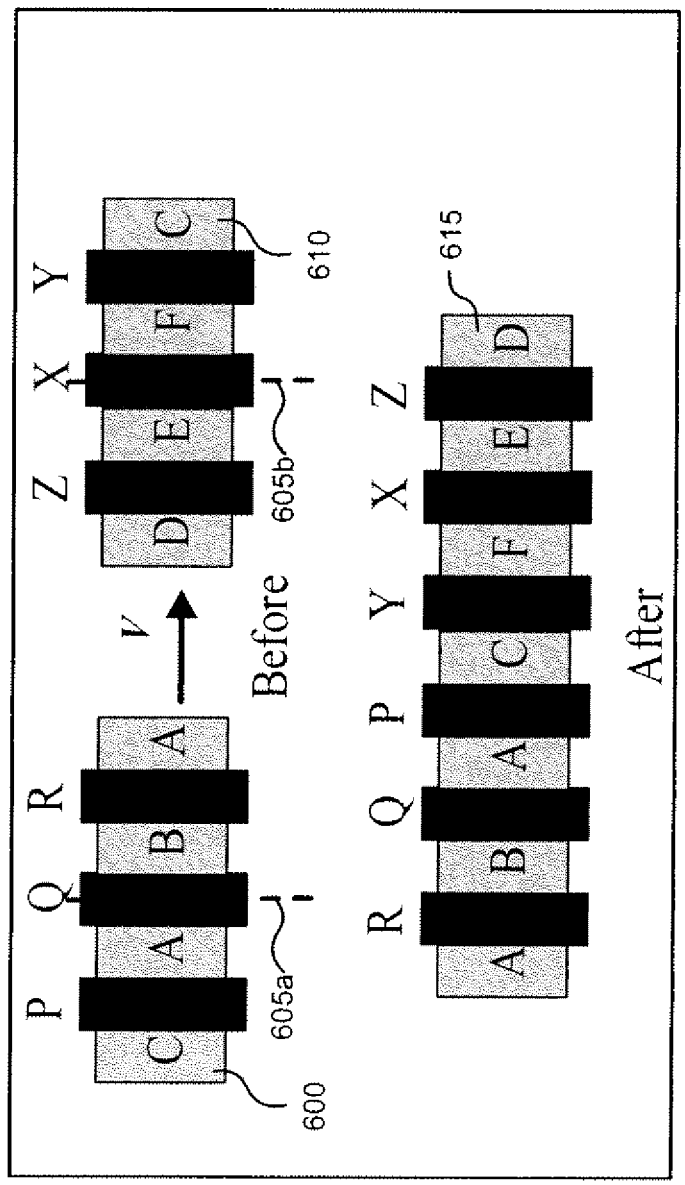

FIG. 6 illustrates before and after examples of a chain mirror transformation performed on a moving and static chains according to one embodiment. In this illustration, portion 600 is mirrored about axis 605a and portion 610 is mirrored about axis 605b. Once the mirroring process is completed, portions 600 and 610 are combined to form chain 615.

Figure 7:
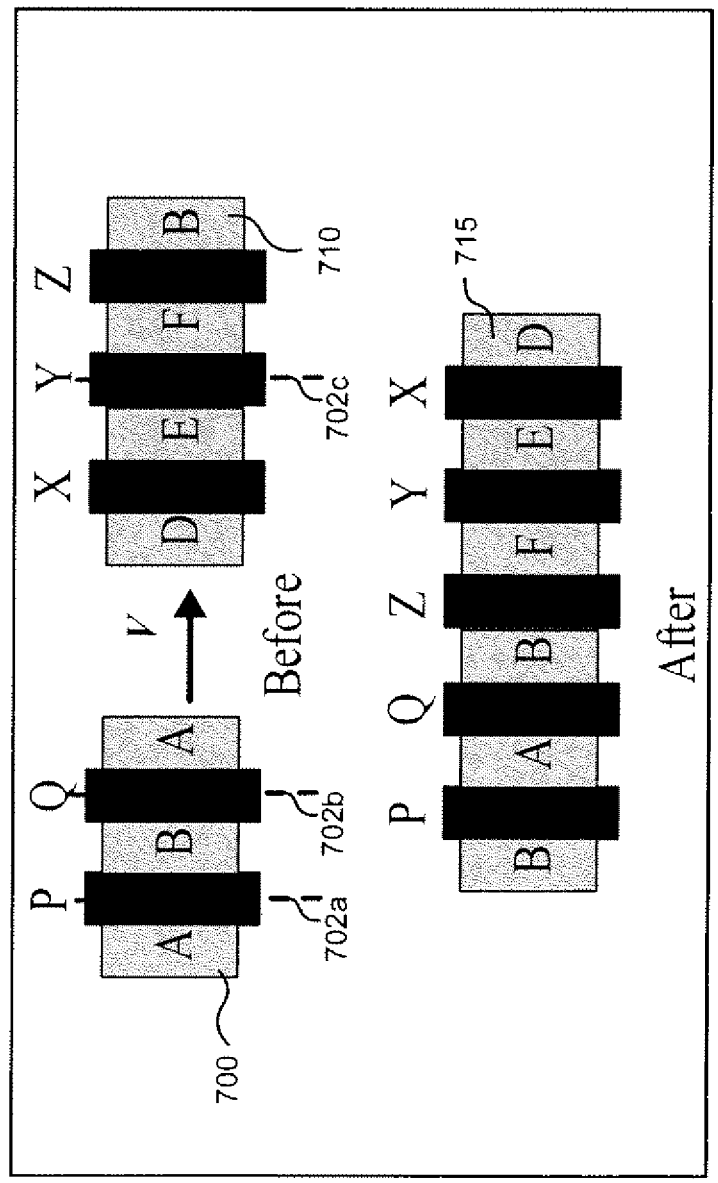

FIG. 7 illustrates before and after examples of a "cascade mirror/permute" and a chain mirror transformation performed on moving and static chains, respectively. As previously mentioned, "cascade mirror/permute" is a short hand for a transformation algorithm in which a cascade mirror is performed on a chain if the chain does not violate the rules in Table 1 or if the chain is a simple chain. If the chain is a complex chain or if mirroring cannot be done effectively, then a cascade mirror permute will be performed. In FIG. 7, portion 700 is cascade mirrored. Device P is mirrored about an axis 702a, and device Q is mirrored about an axis 702b. Additionally, portion 710 is chain mirrored about an axis 702c. Once the cascade mirror and the chain mirror algorithms are completed, portions 700 and 710 are combined to form chain 715.

Figure 8:
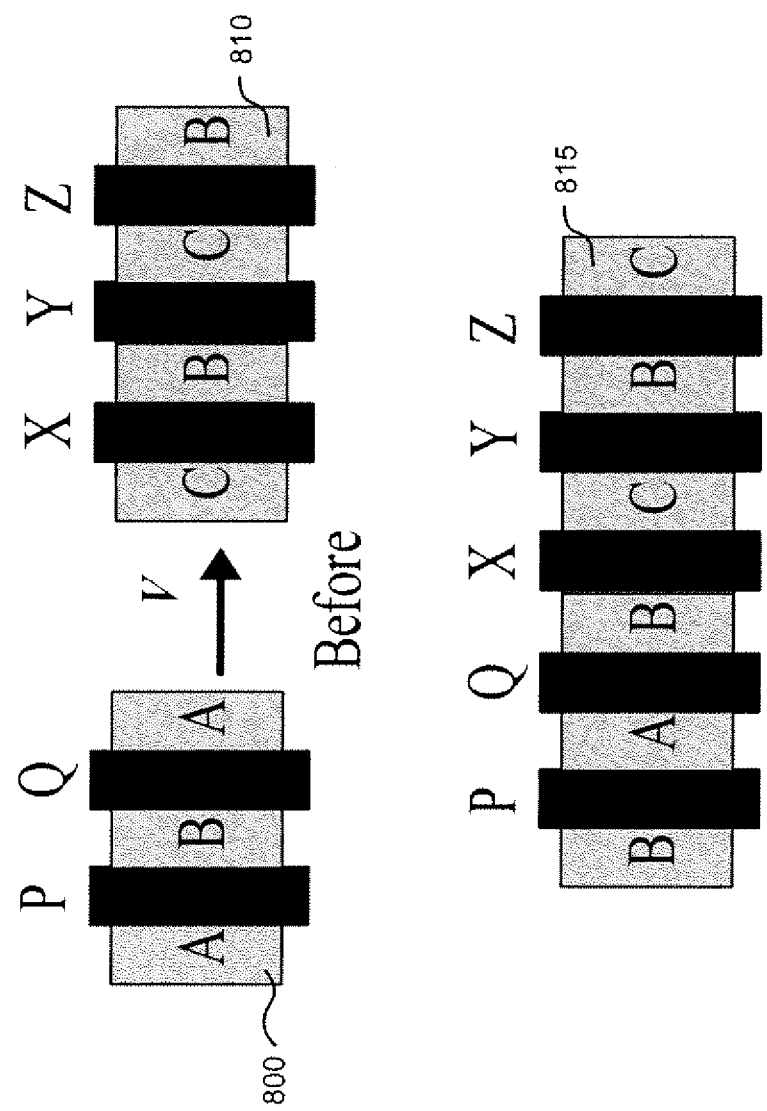

FIG. 8 illustrates, according to one embodiment, before and after examples of a "cascade mirror/permute" algorithm both on the moving and static chains 800 and 810, respectively. After the algorithm is performed, portions 800 and 810 are combined to form chain 815. This particular algorithm is listed as sequence 12 on Table 3.

Figure 9:
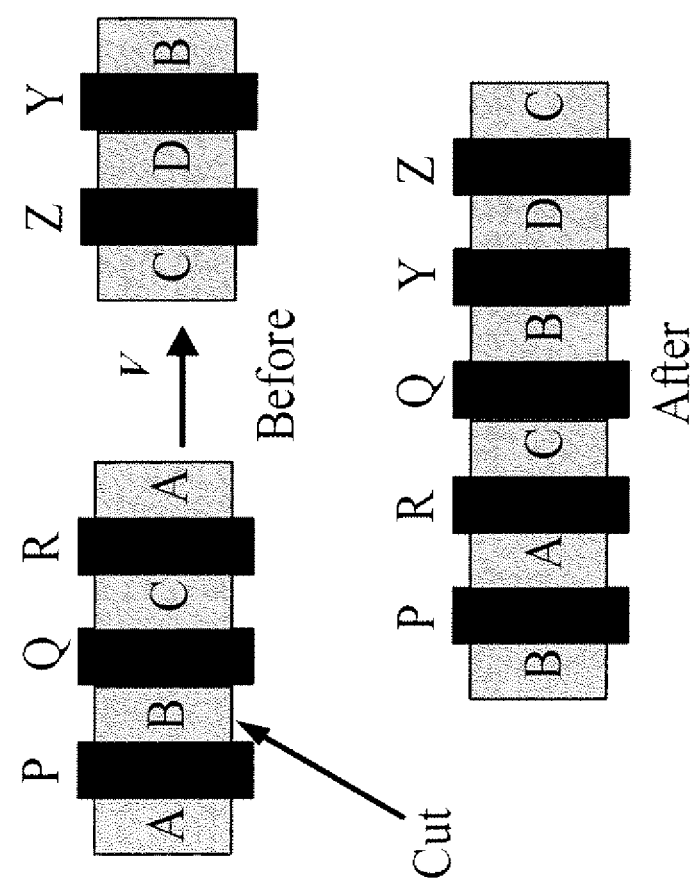

FIG. 9 illustrates before and after examples of a cut chain mirror performed on a moving chain and a chain mirror performed on a static chain according to one embodiment. This particular algorithm is listed as sequence 14 on Table 3.

2.2 Violation Solver Module Process Flow

Figure 10:
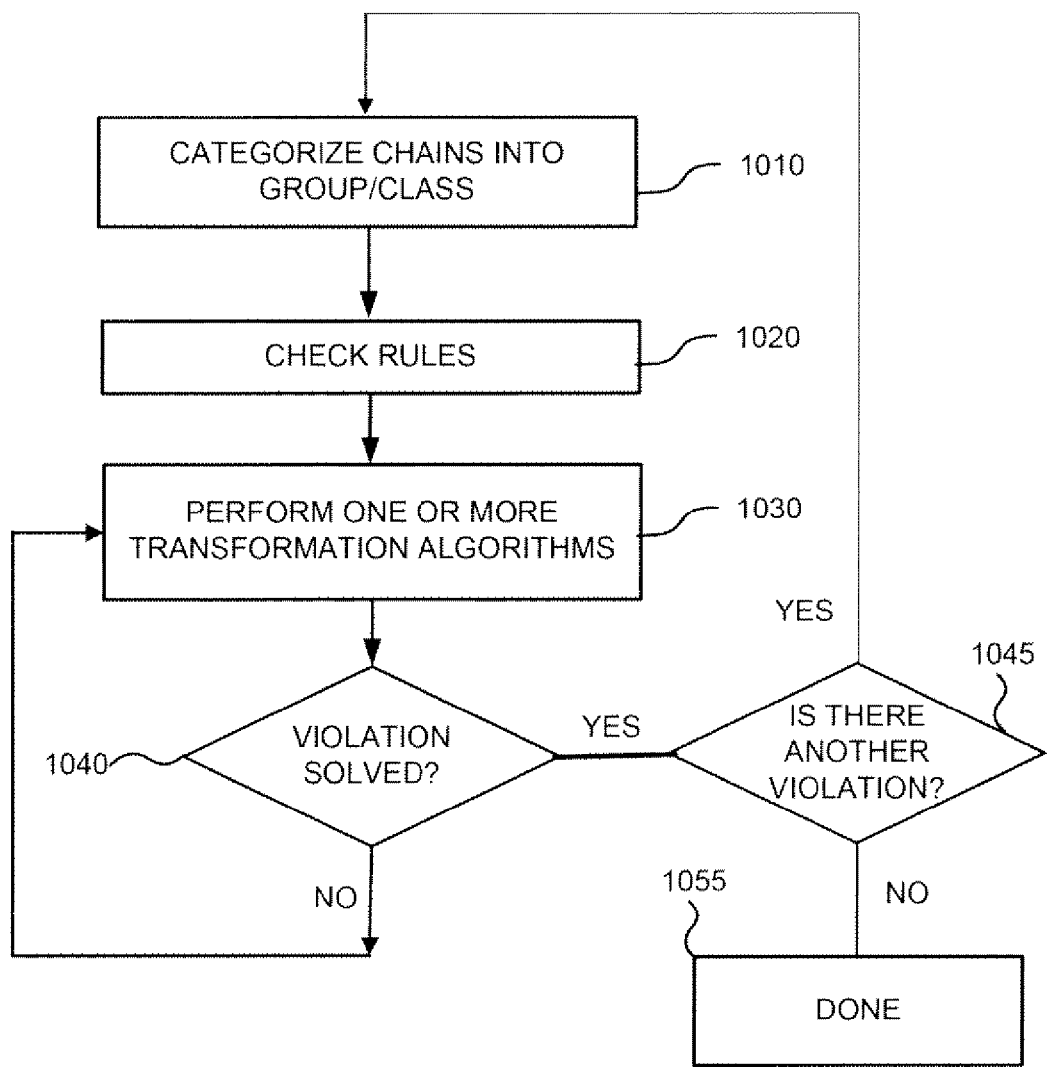
FIG. 10 illustrates an example process flow implemented by the violation solver in accordance with an embodiment of the present invention.

FIG. 10 illustrates an example process flow 1000 implemented by violation solver module 150 according to one embodiment of the invention. Violation solver module 150, in the illustrated example, starts the connection violation solving process at block 1010 in which chains are categorized into class/group. Each chain may be classified into one or more classes and groups. Violation solver module 150 can categorize a circuit chain in a number of different ways including, for example, by symmetry, device type, and number of nets connected to the chain, etc. A chain can be asymmetric or symmetric. Symmetrical chains have the same interface at each end of the chain. An asymmetrical chain has different interfaces at each end of the chain. Generally, a chain has two or more nets. The type of a chain is classified as simple or complex.

In block 1020, violation solver module 150 determines which algorithms to perform on the chain or chains based on the results of block 1010. In one embodiment, this is done using the rules laid out by Table 1. The rules in Table 1 allow violation solver module 150 to determine which algorithms may be performed on the chain based on its classifications.

In block 1030, violation solver module 150 performs one or more of the transformation algorithms listed in Tables 2 and 3. The type of transformation algorithm executed depends on the results from block 1020. For certain connection violations, performing a single transformation algorithm is insufficient to resolve the violations. For these types of persistent violations, violation solver module 150 may execute one or more different transformation schemes to solve the connection violation. In an embodiment, violation solver module 150 uses 17 different schemes comprising live distinct transformation algorithms. Examples of such sequences are shown in Tables 2 and 3. The sequence of algorithms listed in Table 2 and 3 should be performed in the order listed. However, a different order of sequence may be used. Whether an algorithm in the sequence listed in Tables 2 and 3 is performed depends partly on the rules shown in Table 1. For example, violation solver module 150 may elect to start with sequence 2 of Table 1 instead starting at sequence 1 due to a rule conflict with Table 1.

After the transformation algorithm is performed in block 1030, violation solver module 150 checks to see if the connection violation has been solved in block 1040. This block might be performed after every transformation algorithm or every sequence of a transformation algorithm is performed. If the answer is 'NO' in block 1040, then violation solver module 150 advances to the next algorithm in the sequence and repeats blocks 1030 and 1040. If the answer is 'YES' in block 1040, violation solver module 150 checks to see if there are other connection violations at block 1045. If there are other connection violations, blocks 1010 through blocks 1040 are repeated. If there are no more connection violations then the process is completed at block 1055. Although process 1000 is described in the order shown, other orders can be used.

Figure 11:
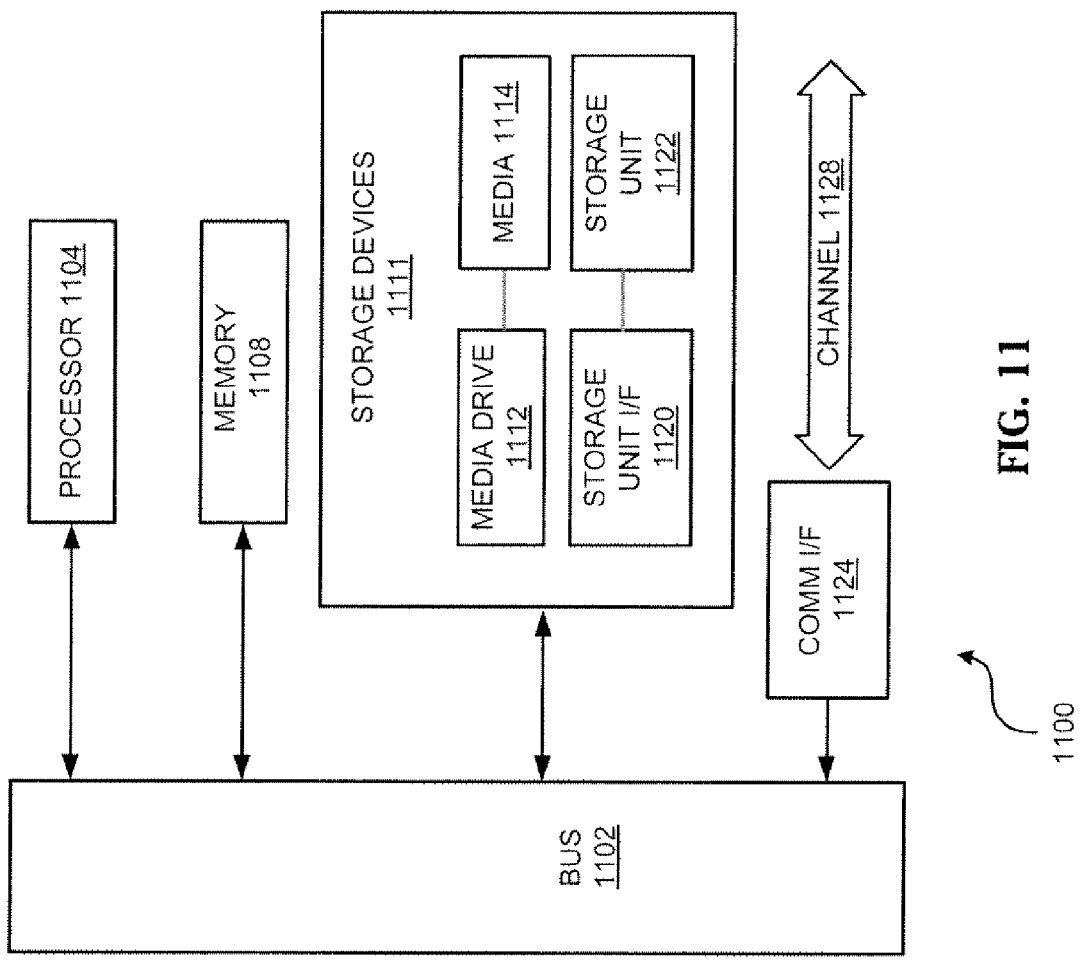
FIG. 11 illustrates an example computer system in which the violation solver application of FIG. 1 can be implemented.

As used herein, the term module might describe a given unit of functionality that can be performed in accordance with one or more embodiments of the present invention. As used herein, a module might be implemented utilizing any form of hardware, software, or a combination thereof. For example, software, firmware, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example computing module 1100. After reading this description, it will become apparent to a person skilled in the relevant art how to implement the invention using other computing modules or architectures.

Referring now to FIG. 11, computing module 1100 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special or general purpose computing devices as may be desirable or appropriate for a given application or environment. Computing module 1100 might also represent computing capabilities embedded within or otherwise available to a given device. For example, a computing module might be found in other electronic devices such as, for example, digital cameras, navigation systems, cellular telephones, modems, routers, WAPs, and any other electronic device that might include some form or processing capabilities.

Computing module 1100 might include one or more processors or processing devices, such as a processor 1104. Processor 1104 might be implemented using a general-purpose or special-purpose processing engine such as, for example, a microprocessor, controller, or other control logic. In the example illustrated in FIG. 11, processor 1104 is connected to a bus 1102 or other communication medium to facilitate interaction with other components of computing module 1100.

Computing module 1100 might also include one or more memory modules, referred to as main memory 1108. For example, preferably random access memory (RAM) or other dynamic memory, might be used for storing information and instructions to be executed by processor 1104. Main memory 1108 might also be used for storing temporary variables or other intermediate information during execution of instructions to be executed by processor 1104. Computing module 1100 might likewise include a read only memory ("ROM") or other static storage device coupled to bus 1102 for storing static information and instructions for processor 1104.

The computing module 1100 might also include one or more various forms of information storage mechanism 1111 which might include, for example, a media drive 1112 and a storage unit interface 1120. The media drive 1112 might include a drive or other mechanism to support fixed or removable storage media 1114. For example, a hard disk drive, a floppy disk drive, a magnetic tape drive, an optical disk drive, a CD or DVD drive (R or RW), or other removable or fixed media drive. Accordingly, storage media 1114, might include, for example, a hard disk, a floppy disk, magnetic tape, optical disk, a CD or DVD, or other fixed or removable medium that is read by, written to or accessed by media drive 1112. As these examples illustrate, the storage media 1114 can include a computer usable storage medium having stored therein particular computer software or data.

In alternative embodiments, information storage mechanism 1110 might include other similar instrumentalities for allowing computer programs or other instructions or data to be loaded into computing module 1100. Such instrumentalities might include, for example, a fixed or removable storage unit 1122 and an interface 1120. Examples of such storage units 1122 and interfaces 1120 can include a program cartridge and cartridge interface, a removable memory (for example, a flash memory or other removable memory module) and memory slot, a PCMCIA slot and card, and other fixed or removable storage units 1122 and interfaces 1120 that allow software and data to be transferred from the storage unit 1122 to computing module 1100.

Computing module 11100 might also include a communications interface 1124. Communications interface 1124 might be used to allow software and data to be transferred between computing module 1100 and external devices. Examples of communications interface 1124 might include a modem or softmodem, a network interface (such as an Ethernet, network interface card, WiMedia, 802.XX or other interface), a communications port (such as for example, a USB port, IR port, RS232 port Bluetooth interface, or other port), or other communications interface. Software and data transferred via communications interface 1124 might typically be carried on signals, which can be electronic, electromagnetic, optical or other signals capable of being exchanged by a given communications interface 1124. These signals might be provided to communications interface 1124 via a channel 1128. This channel 1128 might carry signals and might be implemented using a wired or wireless medium. Some examples of a channel might include a phone line, a cellular phone link, an RF link, an optical link, a network interface, a local or wide area network, and other wired or wireless communications channels.

In this document, the terms "computer program medium" and "computer usable medium" are used to generally refer to media such as, for example, memory 1108, storage unit 1120, media 1114, and signals on channel 1128. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1100 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Although the invention is described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described example embodiments.

Terms and phrases used in this document, and variations thereof unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof: the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of example block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer implemented method for resolving a circuit connection violation resulting from one or more differing net connections, the method comprising:
   responsive to identifying the connection violation because of the one or more differing net connections, categorizing a circuit chain with the connection violation into a plurality of classes;
   wherein the circuit chain comprises one or more devices and one or more interfaces;
   determining which of a plurality of transformation algorithms to apply to the circuit chain based on the categorization; and
   using a computer to perform the determined transformation algorithms on the circuit chain to resolve the circuit connection violation;
   wherein the determined transformation algorithms are configured to alter the one or more interfaces of the circuit chain without destroying the integrity of the devices within the chain.

2. The method of claim 1, wherein the plurality of transformation algorithms comprise at least one of a chain mirror algorithm, a cascade mirror algorithm, a cascade mirror permute algorithm, and a cut mirror algorithm.

3. The method of claim 1, wherein the plurality of classes comprises:
   a first class defined by symmetry;
   a second class defined by a number of nets;
   a third class defined by a chain type;
   a fourth class defined by static chain; and
   a fifth class defined by moving chain.

4. The method of claim 1, further comprising:
   invoking a first sequence of transformation algorithms for the circuit chain with moving chain classification until the connection violation of the circuit chain is resolved, wherein the first sequence comprises:
   performing a chain mirror algorithm,
   performing a cascade mirror algorithm,
   performing a cascade mirror permute algorithm, and
   performing a cut chain mirror algorithm, and
   determining if the connection violation still exists after performing each transformation algorithm in the first sequence, wherein one or more algorithms in the first sequence may be skipped based on the class of the circuit chain.

5. The method of claim 1, further comprising:
   invoking a second sequence of transformation algorithms for the circuit chain with static chain classification, wherein the second sequence comprises:
   performing a chain mirror,
   performing a cascade mirror,
   performing a cascade mirror permute, and
   performing a cut chain mirror, and
   determining if the connection violation still exists after performing each transformation algorithm in the second sequence, wherein one or more algorithms in the second sequence may be skipped based on the class of the circuit chain.

6. The method of claim 1, further comprising:
   invoking a third sequence of transformation algorithms for the circuit chain with a static and a moving chain portions, wherein the third sequence comprises:
   a) performing a chain mirror on the moving chain portion of the circuit chain while performing a chain mirror on the static chain portion of the circuit chain;
   b) performing a chain mirror on the moving chain portion of the circuit chain while performing a cascade mirror permute on the static chain portion of the circuit chain;
   c) performing a cascade mirror or a cascade mirror permute on the moving chain portion of the circuit chain while performing a chain mirror on the static chain portion of the circuit chain; and
   d) performing a cascade mirror or a cascade mirror permute on the moving and static chain portions; and
   e) determining if the connection violation still exists after performing each transformation algorithm in the third sequence, wherein one or more algorithms in the sequence may be skipped based on the class of the circuit chain.

7. The method of claim 6, wherein the third sequence further comprises:
   f) performing a chain mirror on the moving chain portion of the circuit chain while performing a cut chain mirror on the static chain portion of the circuit chain;
   g) performing a cut chain mirror on the moving chain portion of the circuit chain while performing a chain mirror on the static chain portion of the circuit chain;
   h) performing a cascade mirror permute on the moving chain portion of the circuit chain while performing a cut chain mirror on the static chain portion of the circuit chain;
   i) performing a cut chain mirror on the moving chain portion of the circuit chain while performing a cascade mirror permute on the static chain portion of the circuit chain; and
   j) performing a cut chain mirror on the moving chain portion of the circuit chain while performing a cut chain mirror on the static chain portion of the circuit chain.

8. The method of claim 3, wherein performing the determined transformation algorithms further comprises performing the chain mirror algorithm on the circuit chain if it is asymmetric, wherein the chain mirror algorithm comprises mirroring an asymmetric circuit chain about an axis parallel to an abutment interface.

9. The method of claim 3, wherein performing the determined transformation algorithms further comprises:
   performing the cascade mirror algorithm on the circuit chain if it is a simple device type and has two connecting nets,
   wherein the cascade mirror algorithm comprises:
   mirroring each device in the chain in turn about an axis parallel to an abutment interface, and
   re-abutting the abutment interface with a neighboring abutment interface.

10. The method of claim 3, wherein performing the determined transformation further comprises:
    performing the cascade mirror permute algorithm on the circuit chain if it is a complex chain and has two connecting nets,
    wherein the cascade mirror permute algorithm comprises:
    permuting each even-fingered device in the chain, and mirroring each simple device in turn about an axis parallel to an abutment interface; and
    re-abutting the abutment interface with a neighboring abutment interface.

11. The method of claim 3, wherein performing the determined transformation algorithms further comprises:
    performing the cut chain mirror algorithm on the circuit chain if it is symmetric,
    wherein the cut chain mirror algorithm comprises:
    cutting a symmetric circuit chain in two asymmetric chains;
    mirroring each asymmetric circuit chain about an axis parallel to an abutment interface; and
    re-abutting the two asymmetric chains.

12. A system for resolving a circuit connection violation resulting from one or more differing net connections, the system comprising one or more processors that:
    responsive to identifying the connection violation because of the one or more differing net connections, classifies a circuit chain with the connection violation into a plurality of groups by symmetry, number of net, and device type;
    wherein the circuit chain comprises one or more devices and one or more interfaces;
    determines a series of transformation algorithms to apply to the circuit chain based on the classification; and
    invokes the determined series of transformation algorithms on the circuit chain to resolve the circuit connection violation;
    wherein the determined series of transformation algorithms are configured to alter the one or more interfaces of the circuit chain without destroying the integrity of the devices within the chain.

13. The system of claim 12, wherein the series of transformation algorithms comprises:
   a) mirroring the circuit chain about an axis parallel to an abutment interface of the circuit chain,
   b) mirroring each device in the circuit chain in turn about an axis parallel to an abutment interface of the circuit chain,
   c) permuting each even-fingered device and mirroring each simple device in the chain in turn about an axis parallel to an abutment interface, and
   d) cutting a symmetric circuit chain in two asymmetric chains and mirroring each asymmetric circuit chain about an axis parallel to an abutment interface; and
   e) determining if the connection violation still exists after performing each transformation algorithm in the first sequence, wherein one or more algorithms in the series may be skipped based on the classification of the circuit chain.

14. The system of claim 13, wherein b, c, d, and e further comprise:
   re-abutting the abutment interface with a neighboring abutment interface.

15. The system of claim 12, wherein invoking the determined series of transformation algorithms on the circuit chain is based on the plurality of groups.

16. The system of claim 12, wherein the one or more processors:
   invokes a second series of transformation algorithms in sequence for the circuit chain with static chain classification if the connection violation still exists after the first sequence is invoked, wherein the second series comprises:
      performing a chain mirror;
      performing a cascade mirror;
      performing a cascade mirror permute;
      performing a cut chain mirror; and
      determining if the connection violation still exists after performing each transformation algorithm in the second sequence, wherein one or more algorithms in the series may be skipped based on the classification of the circuit chain.

17. The system of claim 12, wherein the one or more processors:
   invokes a third series of transformation algorithms in sequence for the circuit chain with a static and a moving chain portions, wherein the third series comprises:
      a) performing a chain mirror on the moving chain portion of the circuit chain while performing a chain mirror on the static chain portion of the circuit chain;
      b) performing a chain mirror on the moving chain portion of the circuit chain while performing a cascade mirror permute on the static chain portion of the circuit chain;
      c) performing a cascade mirror or a cascade mirror permute on the moving chain portion of the circuit chain while performing a chain mirror on the static chain portion of the circuit chain;
      d) performing a cascade mirror or a cascade mirror permute on the moving and static chain portions; and
      e) determining if the connection violation still exists after performing each transformation algorithm in the second sequence, wherein one or more algorithms in the series may be skipped based on the classification of the circuit chain.

18. The system of claim 17, wherein the third series further comprises:
   f) performing a chain mirror on the moving chain portion of the circuit chain while performing a cut chain mirror on the static chain portion of the circuit chain;
   g) performing a cut chain mirror on the moving chain portion of the circuit chain while performing a chain mirror on the static chain portion of the circuit chain;
   h) performing a cascade mirror permute on the moving chain portion of the circuit chain while performing a cut chain mirror on the static chain portion of the circuit chain;
   i) performing a cut chain mirror on the moving chain portion of the circuit chain while performing a cascade mirror permute on the static chain portion of the circuit chain; and
   j) performing a cut chain mirror on the moving chain portion of the circuit chain while performing a cut chain mirror on the static chain portion of the circuit chain.

19. The system of claim 12, wherein invoking the determined series of transformation algorithms further comprises:
   performing the chain mirror algorithm on the circuit chain if it is asymmetric, wherein the chain mirror algorithm comprises mirroring an asymmetric circuit chain about an axis parallel to an abutment interface.

20. The system of claim 12, wherein invoking the determined series of transformation algorithms further comprises:
   performing the cascade mirror algorithm on the circuit chain if it is a simple device type and has two nets, wherein the cascade mirror algorithm comprises:
      mirroring each device in the chain in turn about an axis parallel to an abutment interface, and
      re-abutting the abutment interface with a neighboring abutment interface.

21. The system of claim 12, wherein invoking the determined series of transformation algorithms further comprises:
   performing the cascade mirror permute algorithm on the circuit chain if it is a complex chain and has two nets, wherein the cascade mirror permute algorithm comprises:
      permuting each even-fingered device and mirroring each simple device in the chain in turn about an axis parallel to an abutment interface; and
      re-abutting the abutment interface with a neighboring abutment interface.

22. The system of claim 12, wherein invoking the determined series of transformation algorithms further comprises:
   performing the cut chain mirror algorithm on the circuit chain if it is symmetric, wherein the cut chain mirror algorithm comprises:
      cutting a symmetric circuit chain in two asymmetric chains;
      mirroring each asymmetric circuit chain about an axis parallel to an abutment interface; and
      re-abutting the two asymmetric chains.

23. The method of claim 1, wherein the method is performed by a computer executing computer readable program code functions embedded in a non-transitory computer useable medium.

* * * * *